Oct. 18, 1966     E. F. KEITER     3,279,059
APPARATUS FOR MACHINING PIPE
Filed Jan. 13, 1965     2 Sheets-Sheet 1
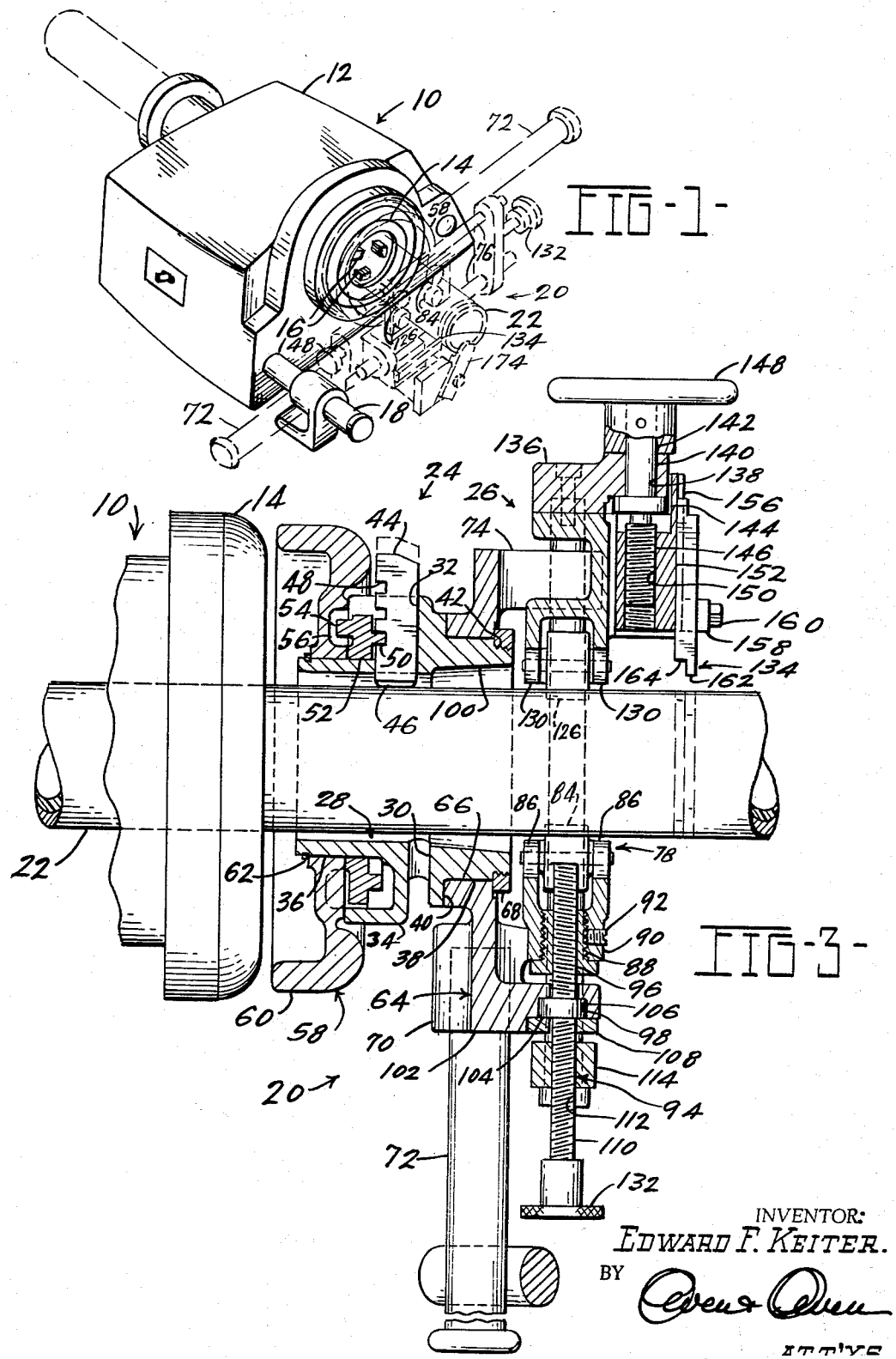
INVENTOR:
EDWARD F. KEITER.
BY
ATT'YS

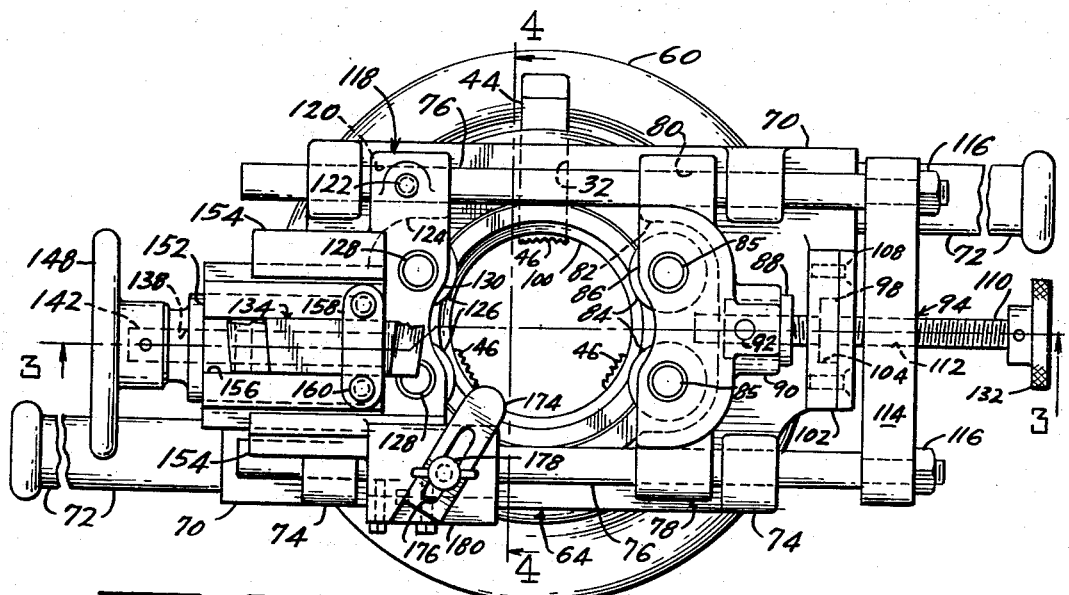
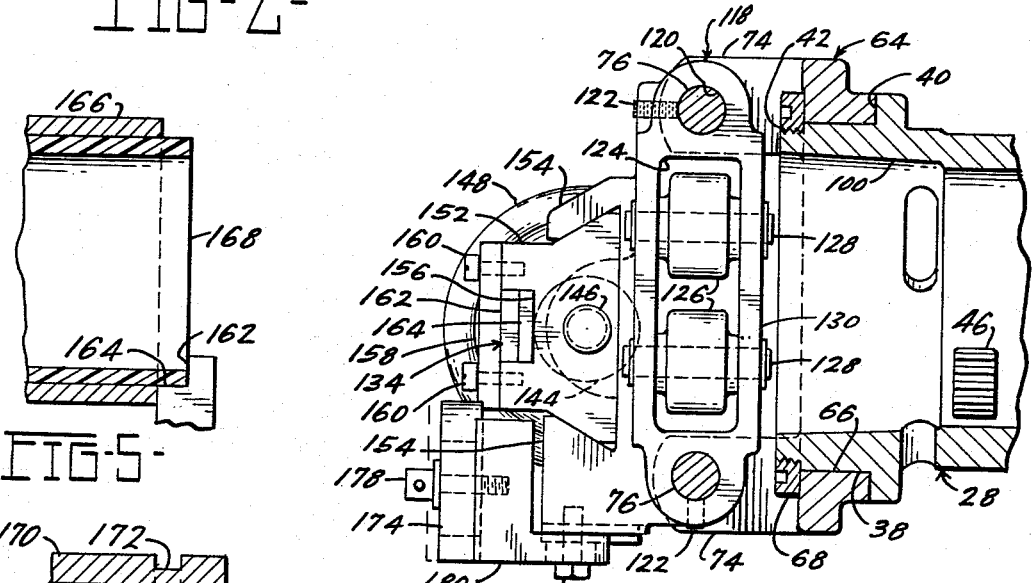
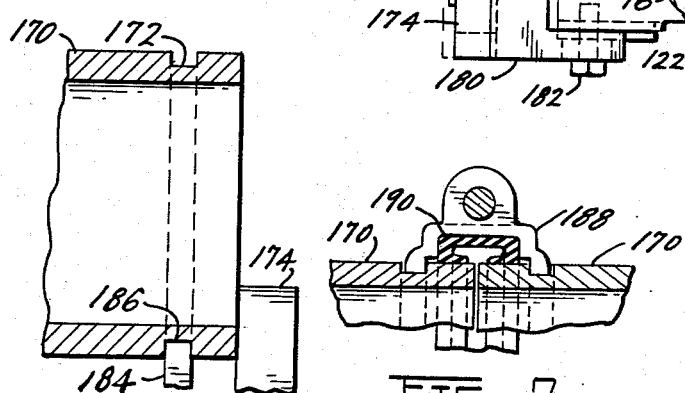
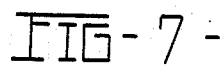

United States Patent Office 3,279,059
Patented Oct. 18, 1966

3,279,059
APPARATUS FOR MACHINING PIPE
Edward F. Keiter, Toledo, Ohio, assignor to Toledo-Beaver Tools, Inc., Toledo, Ohio, a corporation of Ohio
Filed Jan. 13, 1965, Ser. No. 425,166
8 Claims. (Cl. 30—96)

This invention relates to apparatus for machining an end of an elongate body and more particularly to a portable pipe tool for machining an outer portion of an end of a pipe.

Numerous tools are known in the art for cutting off pipe and for threading an end thereof, but such tools have not been capable of precision cutting or machining operations. Tools for cutting off pipe have not required precision, while tools for threading ends of pipe have employed self-centering and threading dies which did not need a precise tool holder.

The present invention relates to apparatus for machining the end of a pipe to more precise dimensions and tolerances than heretofore possible. The new tool according to the invention includes a unique clamping arrangement for attaching the tool to the pipe comprising a combination of jaws which engage and rotate with the pipe for preventing longitudinal movement or creep of the cutter knife during the machining operation. The clamping arrangement also incorporates means for centering the cutter with respect to the axis of the tool to assure uniform depth of cut thereby.

It is, therefore, a principal object of the invention to provide apparatus for machining end portions of pipe more accurately than heretofore possible.

Another object of the invention is to provide apparatus for holding a cutter in a fixed position longitudinally of a pipe during a machining operation and also to center the tool relative to the pipe during the machining operation.

Still another object of the invention is to provide a portable tool for removing an outer portion of a pipe to a precise, uniform depth.

Other objects and advantages of the invention will be apparent from the following detailed description of a preferred embodiment thereof, reference being made to the accompanying drawings, in which:

FIG. 1 is a somwhat schematic view in perspective of a pipe driving unit and a pipe cutting tool embodying the invention shown schematically in dotted lines;

FIG. 2 is an enlarged, end view of the tool;

FIG. 3 is a view in longitudinal cross section of the cutting tool, taken along the line 3—3 of FIG. 2;

FIG. 4 is a detailed view taken along the line 4—4 of FIG. 3;

FIG. 5 is a fragmentary view in longitudinal cross section of a pipe and a cutter used with the tool of FIGS. 1–4;

FIG. 6 is a view similar to FIG. 5 of a different pipe and cutter used with the tool of the invention; and FIG. 7 is a fragmentary, longitudinal cross-sectional view of a coupling using two of the pipes of FIG. 6.

The tool in accordance with the invention can be turned manually on a stationary pipe but preferably is used with a power drive unit 10 as shown in FIG. 1. The power drive unit includes a motor (not shown) in a housing 12 which drives a chuck 14. The chuck 14 has a plurality of radially-movable jaws 16 which engage a pipe inserted through the unit 10 from the rear thereof and through the chuck 14. The unit 10 also includes a pair of outwardly extending projections 18 either of which is effective to prevent rotation of a pipe cutting tool 20 according to the invention, shown in dotted lines in FIG. 1. The tool 20, received on a pipe 22 extending through and engaged by the chuck 14, performs the desired cutting or machining operation on the end of the pipe.

The pipe cutting tool 20 basically includes two assemblies or units, namely a clamping unit 24 and a centering and machining unit 26, which together provide an effective clamping and pipe-engaging arrangement. Referring particularly to FIG. 3, the unit 24 includes a generally cylindrical body 28 having chip openings 30 and radially extending jaw passages 32. The body 28 also has an outer housing portion 34 and an end bearing surface 36. The opposite end of the body includes a bearing surface 38, a shoulder 40, and a threaded end portion 42. A passage 43 formed by the body 28 has a diameter exceeding that of the largest pipe to be used.

Three radially movable jaws 44 are slidably held in the passages 32 and have suitable pipe-engaging projections 46 thereon to prevent slipping when engaged with a pipe to be machined. The jaws 44 also have a plurality of transversely extending grooves 48 of arcuate configuration to fit closely with a spiral ridge 50 on a scroll ring or plate 52. When the scroll plate 52 is turned, the cooperation between the ridge 50 and the grooves 48 cause the jaws 44 simultaneously to be moved radially inwardly or outwardly to engage or be disengaged from a pipe, as is known in the art. The scroll plate 52, in this instance, has rearwardly extending dogs 54 which are engaged in recesses 56 of a hand wheel 58 rotatably mounted on the bearing surface 36 of the body 28. The hand wheel 58 has an outer rim 60 by means of which the wheel can be turned, being held on the bearing surface 36 by a snap ring 62.

Referring to FIGS. 2–4, the centering and machining unit 26 includes a supporting body 64 having an inwardly facing annular bearing flange 66 rotatably mounted on the bearing surface 38 of the body 28. While the body 64 can rotate, it cannot move longitudinally with respect to the unit 24, being held between the shoulder 40 and a threaded ring 68 turned on the threaded end 42 of the body 28. The body 64 also has diagonally opposite sockets 70 for receiving handles 72 which are used to turn the body 64 and the unit 26 when the clamping unit 24 is held on a stationary pipe. When the tool is used with the drive unit 10, the handles are held by the projections 18 to hold the body 64 and the unit 26 stationary when the clamping unit 24 rotates with a driven pipe engaged by the jaws 16 and 44.

The body 64 also has four ears 74 which slidably hold a pair of guide and pull bars 76 which are mounted parallelly in the ears 74 for longitudinal movement. A first carrier 78 has guide passages 80 slidably receiving the bars 76 for movement therealong. The carrier 78 has a main recess 82 in which a pair of centering rollers 84 are rotatably mounted by axles 85 extending through opposite sidewalls 86 of the carrier. A threaded bushing 88 is received in a neck 90 of the carrier 78 and affixed to the carrier by a setscrew 92. A centering rod 94 has a first threaded portion 96 threadedly received in the bushing 88 and has an enlarged flange 98 to the rear thereof. When the rod 94 is turned, the carrier 78 is moved along the threaded portion 96 and thereby moves the rollers 84 toward and away from an opening or pipe passage 100 formed by the body 28.

The centering rod 94 extends through a retainer or supporting post 102 with the flange 98 rotatably held in an enlarged passage 104 thereof. The flange is prevented from moving in one direction by a shoulder 106 and is prevented from moving in the opposite direction by a retaining plate 108 screwed or otherwise suitably affixed to the post 102. The centering rod 94 has a second threaded portion 110 extending beyond the post 102 and the centering rod flange 98, the threads of the portion 110 being opposite to the threads of the first threaded portion 96. The threaded portion 110 is engaged in a threaded passage 112 of a connecting bar 114 which is affixed to ends of the guide and pull bars 76 by nuts 116. When the connecting bar 114 is moved transversely, in a direction parallel to the centering rod 94, it similarly moves the guide and pull bars 76 through the ears 74.

A second carrier 118 is mounted on the bars 76 between the ears 74, the bars being received in passages 120 and affixed thereto by setscrews 122 or other suitable fasteners. The carrier 118 also has a central recess 124 in which are centering rollers 126 rotatably mounted on axles 128 extending through opposite walls 130 of the carrier 118.

A control knob 132 is affixed to the end of the centering rod 94 for the purpose of turning the rod 94. When the rod is turned, the first threaded portion 96 moves the first carrier 78 in one direction. At the same time, the second threaded portion 110 moves the connecting bar 114 in the opposite direction, the bar 114 then causing the guide and pull bars 76 and the second carrier 118 to similarly move. In this manner, the carrier 78 and 118 move in opposite directions and, with threads of equal pitch, they will move the same distance.

When the pipe 22 has been extended through the opening 100, the jaws 44 are moved into engagement with it by turning of the hand wheel 58; the rollers 84 and 126 are similarly moved into contact with the pipe by turning of the knob 132. This assures that the pipe is accurately centered with respect to the tool since the rollers 84 and 126 are always at equal distances from the axis of the tool. The jaws 44, now being firmly engaged on the outer surface of the pipe, prevent any possibility of longitudinal movement of the tool with respect to the pipe during machining thereof. This is important since tools heretofore known have tended to creep during machining operations and thereby decrease the accuarcy of the cuts taken.

A cutter or knife 134 is mounted on the body 64 for movement toward and away from the pipe. In this instance, the cutter 134 is mounted on the second carrier 118 which has a rear bearing member 136 (FIG. 2) having an opening 138 rotatably receiving a cutter adjusting member 140 which includes a rod 142, a flange 144, a threaded shank 146, and a drive handle 148. The flange 144 and the end of the handle 148 hold the threaded shank 146 in a fixed position relative to the bearing member 136. The shank 146 is received in a threaded passage 150 of a cutting tool block 152 which has beveled sides cooperating with converging flanges 154 integral with the carrier 118. The block 152 is thereby closely guided and supported by the flanges 154.

The upper surface of the block 152 has a longitudinally-extending groove 156 therein to receive the cutting tool 134, the tool being supported in fixed position on the block 152 by a clamping bar 158 and machine screws 160. The tool 134, in this instance, has similar opposite ends so that it can be reversed with respect to the block 152 by loosening the machine screws 160, if desired, when the tool becomes dull.

When the tool 20 is first clamped and centered on a pipe, the cutter 134 is retracted to an out-of-the-way position. When the machining operation is to begin, the cutter 134 is moved toward the pipe by means of the handle 148 which rotates the shank 146 to move the block 152 and the cutter 134 toward the pipe. A precise cut is assured with this arrangement since the overall tool cannot possibly move longitudinally with respect to the pipe due to the action of the jaws 44. Further, the depth of the cut made by the cutter is assured of being uniform since the cutter is maintained at a uniform distance from the axis of the pipe due to the centering action of the rollers 84 and 126 and their associated carriers 78 and 118.

With the cutter 134, a special metal and plastic pipe as shown in FIG. 5 can be machined. In this instance, a projecting cutting edge 162 cuts off the pipe to length while a retracted cutting edge 164 removes or strips an outer metal layer 166 of the pipe to leave a projecting annular plastic sleeve 168. When the resulting pipe is then assembled with other pipes, fittings, etc., the plastic sleeve cooperates with plastic liners or sleeves of the associated pipe or fitting to prevent corrosive materials carried thereby from reaching and attacking the metal layer 166 of the pipe. To achieve this result, the pipe must be machined very accurately. The end of the plastic sleeve 168 must be cut squarely and the metal 166 stripped away smoothly and to a precise, uniform depth. The tool 20 is capable of achieving the required precision, however, because the jaws 44 assure that the body 28, and, hence, the body 64 and the cutter 134 cannot move longitudinally with respect to the pipe during the machining operation, as has heretofore been common. Secondly, the centering rollers 84 and 126 assure that the cutter will be a uniform and precise distance from the axis of the tool so that the depth of the metal removed will be uniform and no metal will be left on the plastic sleeve 168 nor will any of the sleeve be stripped away.

A grooved metal pipe 170, as shown in FIG. 6, can also be produced, with an accurately cut groove 172 located at a predetermined distance from a squarely-cut end thereof. In this instance, the end of the pipe is squarely cut first and then inserted in the tool until it contacts an adjustable stop 174 (FIGS. 2 and 4). The adjustable stop 174 in this instance has a slot 176 which receives a pivot bolt 178 to fasten the stop to a supporting block 180. The block 180, in turn, is affixed to the carrier 118 by a machine screw 182 or the like. With the pipe properly positioned longitudinally by the stop 174, the jaws 44 and the rollers 84 and 126 are moved into engagement with the pipe and a cutter 184 with a single square end 186 is moved against the pipe to machine the groove to a predetermined depth.

The pipe 170 with the groove 172 is used with a high-pressure coupling and another pipe to effect a high pressure joint having smooth internal surfaces which do not interrupt flow of fluid therein. An application of this nature is shown in FIG. 7 wherein two of the pipes 170 are joined by a high pressure clamping ring 188 which fits closely in the grooves 172 of the pipe 170. A suitable resilient sealing member 190 is retained by the clamping ring 188. The required precision machining of the groove 172 again is achieved with the tool 20.

It will be seen from the above, that the unique pipe machining tool according to the invention provides clamping means by which a cutter is assured of a fixed, precise position relative to the longitudinal extent of the pipe during a machining operation. The tool also includes centering means by which the cutter will be a fixed, uniform distance from the pipe to assure a constant depth of cut. The tool is thereby capable of much more accurate machining operations than pipe cutting tools heretofore known.

Various modifications of the above described embodiment of the invention will be apparent to those skilled in

I claim:

1. A cutting tool for cutting a pipe having an inner layer and an outer layer, said tool comprising a clamping unit designed to engage the pipe, said unit having a plurality of jaws and means for moving said jaws generally radially to clamp the pipe and prevent rotational and longitudinal movement of said clamping unit with respect thereto, a centering and machining unit connected to said clamping unit for rotational movement only with respect thereto, said centering unit including radially movable roller means positioned to be on diametrically opposite sides of the pipe and equally spaced from an axis which extends through said tool and is centrally located with respect to said jaws, means for moving said roller means equal distances toward and away from the axis of the cutting tool to maintain the pipe coaxial with the axis of the tool regardless of the diameter of the pipe, a cutter carried by said centering unit, said cutter having a projecting cutting edge for cutting the pipe in two and a retracted cutting edge for removing a narrow ring of at least part of the outer layer of the pipe, and means for moving said cutter toward and away from the tool axis.

2. A pipe cutting tool comprising a clamping unit and a centering and machining unit, said clamping unit comprising a body having a central passage larger in diameter than the largest pipe expected to be cut, said body having a plurality of radially-extending passages, a jaw member in each of said passages, means engaging said jaw members for moving them radially inwardly and outwardly equal distances, said centering unit having means cooperating with said clamping unit to enable said centering unit to rotate relative to said clamping unit and to prevent longitudinal movement relative to said clamping unit, roller means positioned to be on diametrically opposite sides of a pipe and spaced equal distances from a central axis of the tool extending through the central passage, single means for simultaneously moving said roller means radially in and out substantially equal distances to maintain said roller means at equal distances from the axis and to maintain the pipe coaxially with an axis of said passage regardless of the pipe diameter, a cutter carried by said centering means, and means for moving said cutter in and out relative to said roller means.

3. A pipe cutting tool comprising a clamping unit and a centering and machining unit, said clamping unit comprising a body having a central passage larger in diameter than the largest pipe expected to be cut, said body having a plurality of radially-extending passages, a jaw member in each of said passages, means engaging said jaw members for moving them radially inwardly and outwardly equal distances, said centering unit having means cooperating with said clamping unit to enable said centering unit to rotate relative to said clamping unit and to prevent longitudinal movement relative to said clamping unit, two pairs of rollers positioned to be on opposite sides of a pipe and equal distances from an axis through the tool which extends symmetrically with respect to said jaw members, means supporting said rollers in a plane perpendicular to the pipe, means for moving said pairs in and out substantially equal distances to maintain them at substantially equal distances from the tool axis, a cutter carried by said roller support means and movable in and out with said two pairs of rollers, said cutter having a cutting edge facing toward the axis of said tool, and means for moving said cutter in and out relative to said roller support means.

4. A pipe cutting tool comprising a clamping unit and a centering and machining unit, said clamping unit comprising a generally cylindrical body having a central passage larger in diameter than the largest pipe expected to be cut, said body having a plurality of radially-extending passages, a jaw member in each of said radial passages, each of siad jaw members having a plurality of transverse grooves in one side thereof, a scroll rotatably held on an end of said body and having a spiral ridge engaging said grooves of said jaw members, said scroll simultaneously moving said jaw members radially inwardly and outwardly by equal amounts when said scroll is rotated, said centering unit comprising a supporting body having flange means cooperating with said clamping unit to enable said centering unit to rotate relative to said clamping unit and to prevent longitudinal movement of said centering unit relative to said clamping unit, two pairs of rollers, means supporting said rollers in a plane perpendicular to the pipe, means for moving said pairs in and out substantially equal distances, a cutter carried by said roller support means and having a cutting edge facing toward the axis of said tool, and means for moving said cutter in and out relative to said support means.

5. A pipe cutting tool comprising a clamping unit and a centering and machining unit, said clamping unit comprising a body having a central passage therethrough, said body having a plurality of generally radially extending passages, a jaw member in each of said passages, means engaging said jaw members for moving them radially inwardly and outwardly equal to distances to engage and to release a pipe, said centering and machining unit comprising a supporting body having flange means rotatably supported on said clamping unit body to enable said centering unit to rotate relative to said clamping unit, means on said clamping unit body to prevent longitudinal movement of said centering unit relative to said clamping unit, two pairs of rollers, means supporting said rollers in a plane perpendicular to the axis of the tool and on opposite sides of the axis, means for moving said pairs in and out along generally radial directions and for equal distances, a cutter having a cutting edge directed toward the axis of the tool, means holding said cutter and means for supporting said cutter holding means on one of said roller supporting means and for moving said cutter toward and away from the axis relative to said roller supporting means.

6. A pipe cutting tool according to claim 5 and a stop member carried by one of said roller supporting means for limiting the distance the end of a pipe can extend beyond a plane perpendicular to the axis of the tool and passing through said cutter.

7. A pipe cutting tool according to claim 5 characterized by said tool having an extended cutting edge for cutting the pipe in two and a retracted adjacent cutting edge for stripping metal from the surface of said pipe.

8. A pipe cutting tool comprising a clamping unit and a centering and machining unit, said clamping unit comprising a generally cylindrical body having a central passage larger in diameter than the largest pipe expected to be cut, said body having a plurality of radially-extending passages, a jaw member in each of said radial passages, each of said jaw members having a plurality of transverse grooves in one side thereof, a scroll rotatably held on an end of said body and having a spiral ridge engaging said grooves of said jaw members, said scroll simultaneously moving said jaw members radially inwardly and outwardly by equal amounts when said scroll is rotated, said centering unit comprising a supporting body having flange means cooperating with said unit to enable said centering unit to rotate relative to said clamping unit, means on said body of said clamping unit for preventing longitudinal movement of said centering unit relative to said clamping unit, two pairs of rollers, means supporting said rollers in a plane perpendicular to the axis of the tool and on opposite sides of the axis, means for moving pairs in and out along generally radial directions and for equal distances, a cutter having a cutting edge directed toward the axis of the tool, means holding said cutter, and means for supporting said cutter holding means on one of said roller supporting means and for moving said cutter toward and away from the tool axis relative to said roller supporting means.

References Cited by the Examiner

UNITED STATES PATENTS

| | | | |
|---|---|---|---|
| 784,445 | 3/1905 | Sylvester | 30—98 |
| 1,310,957 | 7/1919 | Nonneman | 30—98 |
| 1,312,187 | 8/1919 | Konigsberg | 30—96 |
| 1,932,462 | 10/1933 | Howlett | 30—97 |
| 2,697,875 | 12/1954 | McIver | 30—99 |
| 2,798,390 | 7/1957 | Bennett | 30—94 X |
| 2,808,255 | 10/1957 | Darcey et al. | 30—96 X |
| 3,023,655 | 3/1962 | McDaniel | 30—100 X |
| 3,088,352 | 5/1963 | Tanner | 30—97 X |
| 3,168,002 | 2/1965 | Walling | 30—97 X |

FOREIGN PATENTS

| | | |
|---|---|---|
| 271,466 | 3/1914 | Germany. |
| 831,098 | 3/1960 | Great Britain. |

WILLIAM FELDMAN, *Primary Examiner.*

MYRON C. KRUSE, *Examiner.*

EDWARD C. ALLEN, *Assistant Examiner.*